(12) United States Patent
DeRoo

(10) Patent No.: US 6,279,080 B1
(45) Date of Patent: Aug. 21, 2001

(54) METHOD AND APPARATUS FOR ASSOCIATION OF MEMORY LOCATIONS WITH A CACHE LOCATION HAVING A FLUSH BUFFER

(75) Inventor: John Edward DeRoo, Hopkinton, MA (US)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/328,976

(22) Filed: Jun. 9, 1999

(51) Int. Cl.$^7$ .................................................. G06F 12/08
(52) U.S. Cl. ................................................. 711/135; 711/3
(58) Field of Search .................................. 711/135, 203, 711/3

(56) References Cited

U.S. PATENT DOCUMENTS

| | | | |
|---|---|---|---|
| 5,640,533 | * 6/1997 | Kirk et al. | 711/133 |
| 5,845,325 | * 12/1998 | Loo et al. | 711/135 |
| 5,875,466 | * 2/1999 | Wakerly | 711/138 |
| 6,240,484 | * 5/2001 | Witt | 711/3 |

* cited by examiner

Primary Examiner—Jack A. Lane
(74) Attorney, Agent, or Firm—Vedder, Price, Kaufman & Kammholz

(57) ABSTRACT

A method and apparatus for associating memory locations with cache locations includes processing that begins by receiving a request for access to a memory block of memory from one of a plurality of clients. A client may be a host processor, a video graphics processor, or an application running on a host processor or video graphics processor. The processing continues by determining whether a physical cache address associated with the memory block is identified in a flush buffer when the memory block is not currently allocated a logical cache address. The logical cache address is utilized by the system memory controller to allocate a physical cache address of the cache to the memory block. The flush buffer contains addresses of physical cache locations that have been identified to be flushed back to the memory, but are not directly accessible by the host processor since the logical address allocation has been deleted. The processing continues by allocating one of the plurality of logic cache addresses to the memory block when the physical cache address is identified in the flush buffer. The processing then continues by associating the one of the plurality of logical cache addresses with the physical cache address.

20 Claims, 11 Drawing Sheets

FIG. 7 operational interval #6

| command received | command performed |
|---|---|
| read B | |
| write C | | physical cache 28

|   | 0 | 1 |
|---|---|---|
| 0 | A | C |
| 1 |   |   |
| 2 |   |   |
| 3 | D | B |
| 4 |   |   |
| 5 |   |   | logical cache 30

|   | 0 | 1 |
|---|---|---|
| 0 | B | A |
| 1 |   |   |
| 2 |   |   | memory 14

| A | B | C | D |
|---|---|---|---|
| E | F | G | H |
| I | J | K | L | read/write buffer 34: B, $A_2$, D, C fill buffer 36 flush buffer 40 mapping information 50

| PCA | memory |
|---|---|
| 00 | A |
| 01 | C |
| 30 | D |
| 31 | B |

FIG. 8 operational interval #7

| command received | command performed |
|---|---|
| RW memory B | |
| | |
| | | physical cache 28

|   | 0 | 1 |
|---|---|---|
| 0 | A | C |
| 1 |   |   |
| 2 |   |   |
| 3 | D | B |
| 4 |   |   |
| 5 |   |   | logical cache 30

|   | 0 | 1 |
|---|---|---|
| 0 | B | A |
| 1 |   |   |
| 2 |   |   | memory 14

| A | B | C | D |
| E | F | G | H |
| I | J | K | L | mapping information 50

| PCA | memory |
|---|---|
| 00 | A |
| 01 | C |
| 30 | D |
| 31 | B | flush buffer 40

| | | | | | |
|---|---|---|---|---|---| fill buffer 36

| B | | | | | |
|---|---|---|---|---|---| read/write buffer 34

| B | $A_2$ | D | | | |
|---|---|---|---|---|---|

FIG. 9 operational interval #8

| command received | command performed |
|---|---|
|  |  |
|  |  |
|  |  | physical cache 28

|   | 0 | 1 |
|---|---|---|
| 0 | A |   |
| 1 |   |   |
| 2 |   |   |
| 3 | D | B |
| 4 |   |   |
| 5 |   |   | logical cache 30

|   | 0 | 1 |
|---|---|---|
| 0 | B | A |
| 1 |   |   |
| 2 |   |   | memory 14

| A | B | C | D |
| E | F | G | H |
| I | J | K | L | mapping information 50

| PCA | memory |
|---|---|
| 00 | A |
| 01 |   |
| 30 | D |
| 31 | B | flush buffer 40

|  |  |  |  |  |  |
|---|---|---|---|---|---| fill buffer 36

|  |  |  |  |  |  |
|---|---|---|---|---|---| read/write buffer 34

| $B_2$ | $B_1$ | $A_2$ | D |  |  |
|---|---|---|---|---|---|

METHOD AND APPARATUS FOR ASSOCIATION OF MEMORY LOCATIONS WITH A CACHE LOCATION HAVING A FLUSH BUFFER

TECHNICAL FIELD OF THE INVENTION

This invention relates generally to memory systems and more particularly to memory systems that include cache memory.

BACKGROUND OF THE INVENTION

A computing system, such as a personal computer, a work station, a laptop computer, a handheld computer, a personal digital assistant (PDA), a video game system, etc, is known to include a processing device (e.g., a central processing unit), associated memory (e.g., system memory), video graphics circuitry, and peripheral ports. The peripheral ports enable the central processing unit to communicate with peripheral devices such as printers, monitors, keyboards, joysticks, a mouse, etc. The video graphics circuitry processes graphics data, which it receives from the central processing unit, and/or video data to produce display data. The video graphics circuitry receives the video data from a video decoder operably coupled to receive video signals from video sources, such as television broadcast signals, cable signals, satellite signals, etc.

As is also known, the central processing unit and/or video graphics circuitry utilizes memory to store programming instructions, intermediate processed data, and processed data. To improve the speed of memory access, most computing systems include cache memory. Cache memory temporarily stores data from a larger, slower memory to allow the central processing unit and/or video graphics circuitry to access the data at higher speeds than if were to access the data from the memory. The higher speeds are due, at least in part, to the cache memory being smaller than the memory and to its being coupled to the central processing unit and/or video graphics circuitry via dedicated buses.

Utilization of cache memory is most effective when the data retrieved from the slower memory (e.g., the system memory) will be used repeatedly by the host processor (e.g., the central processing unit and/or video graphics circuitry). When the host processor needs access to data, a command is provided to a memory controller that retrieves the data from memory and provides it to the cache. This data transfer requires at least the same number of clock cycles as if the host processor were to access the memory directly. Once the data is in the cache memory, the host processor may access it in much less time than accessing the memory directly. As such, the less transferring of data between the cache and memory and the more the host processor utilizes the data within the cache, the more efficient the cache memory system.

To insure that the cache memory is utilized more efficiently, the cache memory is associated with the larger slower memory in predetermined manners. For example, a group of locations in the system memory is typically associated with a section of the cache memory. This association improves cache utilization efficiency in that typically when the host processor requires data, the data is stored in the same memory block or within a few memory blocks (e.g., the memory groupings). As such, by retrieving a memory block's worth of data, the host processor is most likely going to need the other data for subsequent operations. Once the host processor has completed its operations upon the data stored in cache, it flags the data to be flushed to the slower memory. Once the data has been flushed, if the host processor needs data contained within the particular memory block, it must be refilled from the slower memory to the cache. If the memory block is repeatedly filled and flushed from cache memory, a process that is known as thrashing, the cache memory system is not being utilized in an efficient manner.

To help reduce thrashing, some computing systems include a victim cache. The victim cache is a separate memory device that stores the memory block of data that has been flushed. As such, when a memory block has been flushed, it is not directly flushed to the slower memory, it is first flushed to the victim cache. (Note that the victim cache may be set up as a write-through cache such that the data is flushed to the victim cache and the slower memory at the same time.) The victim cache can be organized as a fully associative first-in/first-out buffer, and it will store the memory block data until it is full. When full, it flushes the oldest memory data block to the slower memory. If, while the victim cache is storing a memory block data that the host processor desires, the memory block data is provided from the victim cache to the cache. Note that the system memory controller coordinates the transfer of data between the cache and victim cache and that, to the host processor, the victim cache does not appear to exist.

While the victim cache reduces the latency encountered with thrashing, there is a processing issue once the victim cache is full and the cache has data to flush. For non-write-through victim caches, once the victim cache is full, it must be flushed before the cache can flush its data to the victim cache. As is known for this situation, the cache cannot be filled until it is flushed. Thus, the host processor is delayed for multiple cache flush operations before it can continue its processing with respect to the newly accessed data. Another issue with the victim cache, because it is fully associative, it utilizes physical addresses of the slower memory, which are significantly bigger than logical cache addresses of the cache. As such, the memory controller requires larger adders, multipliers, etc. to process the addresses for the victim cache than for the cache.

Therefore, a need exists for a method and apparatus that extends a physical cache to reduce latency issues related to thrashing without the limitations of victim cache.

BRIEF DESCRIPTION OF THE DRAWINGS

FIGS. 2–9 illustrate an operational example of the memory system of FIG. 1;

DETAILED DESCRIPTION OF A PREFERRED EMBODIMENT

Generally, the present invention provides a method and apparatus for associating memory locations with cache locations. Such a method and apparatus includes processing that begins by receiving a request for access to a memory block of memory from one of a plurality of clients. A client may be a host processor, a video graphics processor, or an application running on a host processor or video graphics processor. The processing continues by determining whether a physical cache address associated with the memory block is identified in a flush buffer when the memory block is not currently allocated a logical cache address. The logical cache address is utilized by the system memory controller to allocate a physical cache address of the cache to the memory block. The flush buffer contains addresses of physical cache locations that have been designated to be flushed back to the memory, but which are not directly accessible by the host processor since the logical address allocation has been deleted. The processing continues by allocating one of the plurality of logical cache addresses to the memory block when the physical cache address is identified in the flush buffer. The processing then continues by associating the one of the plurality of logical cache addresses with the physical cache address. As such, the data stored within the cache location identified in the flush buffer is reestablished as part of the cache and is accessible to the host processor without thrashing. With such a method and apparatus, the data stored within cache locations that have been flagged to be flushed are identified based on the cache address, as opposed to the memory location address such that the system memory controller requires less sophisticated adders, multipliers, etc., to process the addresses. In addition, the filling of new data does not have to wait for multiple flushes to occur before the requested data can be filled.

Figure 1:
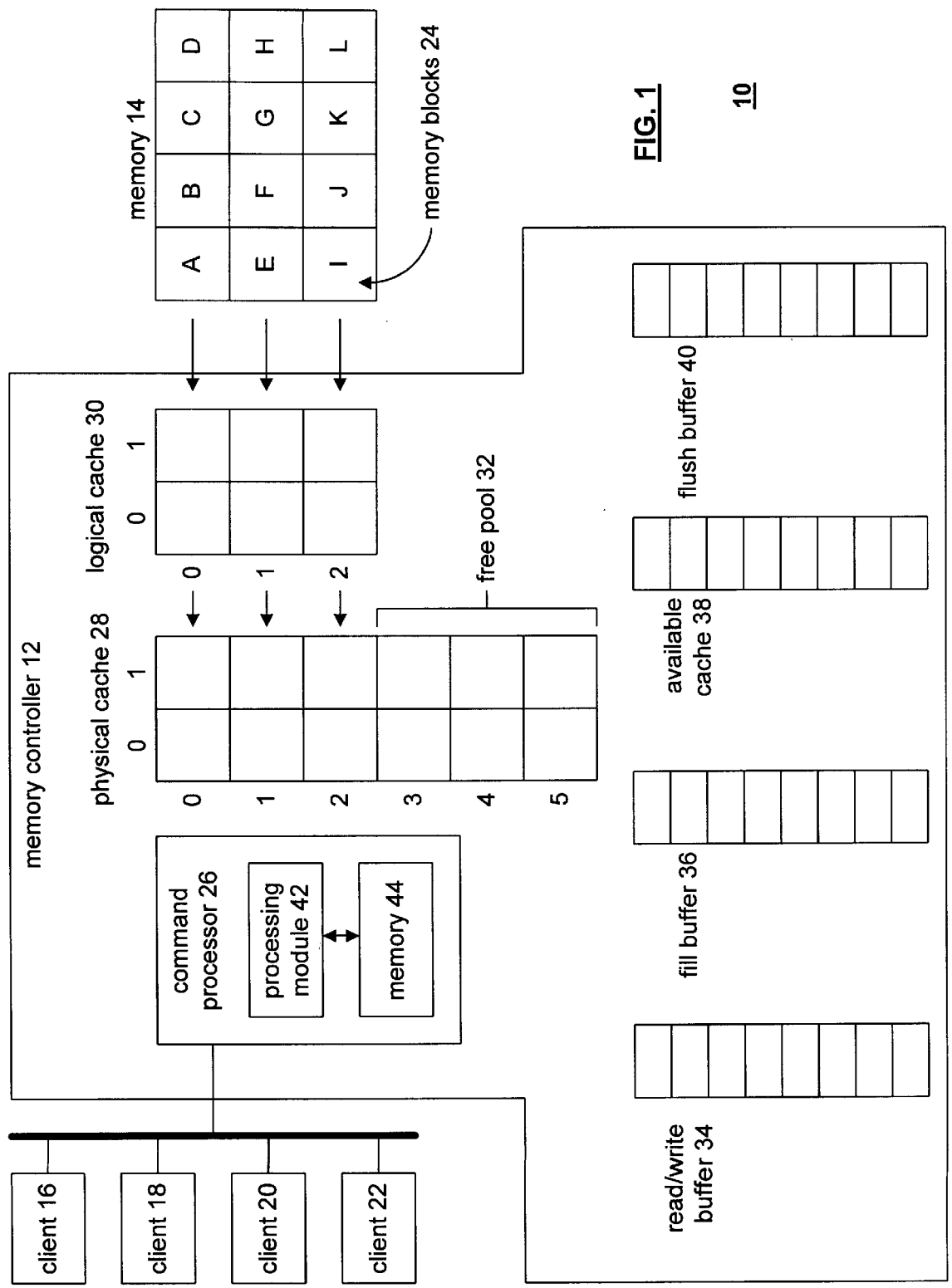
FIG. 1 illustrates a schematic block diagram of a memory system in accordance with the present invention.

The present invention can be more fully described with reference to FIGS. 1–11. FIG. 1 illustrates a schematic block diagram of a memory system 10 that includes a memory controller 12, memory 14, and a plurality of clients 16–22. The memory system 10 may be included in a computing system such as a personal computer, workstation, laptop computer, handheld computer, personal digital assistant, video game, etc. The clients 16–22 may be host processors or applications running on host processors. The host processor may be a video graphics processor and/or a central processing unit. The applications, for a video graphics host processor, include rendering graphics data, processing video data, retrieving data from texture maps, etc., and, for a central processing host unit, include word processing, drawing, spreadsheet, etc.

As shown, memory 14 is divided into a plurality of memory blocks 24. Each row of memory blocks 24 in memory 14 has a corresponding row of physical cache 28 within memory controller 12. As also shown, memory controller 12 includes the physical cache 28, a command processor 26, a read-write buffer 34, a fill buffer 36, an available cache buffer 38, and a flush buffer 40. The physical cache 28 has a corresponding logical address for each cache location currently being used (wherein the logical addresses are shown as a logical cache 30). In addition, the physical cache 28 includes a free pool 32, which are locations not currently being used. The free pool 32 is utilized to extend the amount of data maintained within the physical cache before being flushed back to memory 14. The utilization of the free pool will be discussed in greater detail with reference to FIGS. 2–9.

The command processor 26 includes a processing module 42 and memory 44. The processing module 42 may be a single processing device or a plurality of processing devices. Such a processing device may be microprocessor, microcontroller, digital signal processor, central processing unit, video graphics circuit, video graphics processor, state machine, logic circuitry, and/or any device that manipulates signals based on operational instructions. The memory 44 may be a single memory device or a plurality of memory devices. Such a memory device may be a read-only memory, random access memory, system memory, hard disk memory, floppy disk memory, external memory, magnetic tape memory, and/or any device that stores digital information. Note that when the processing module 42 implements one or more of its functions via a state machine or logic circuitry, the memory 44 storing the corresponding operational instructions may be embedded within the circuitry comprising the state machine and/or logic circuitry. The operational instructions stored in memory 44 and executed by the processing module 42 will be discussed in greater detail with reference to FIGS. 2–11.

In operation, the command processor 26 receives requests from the plurality of clients to access data within memory 14. Based on these requests, the command processor 26 assigns a logical cache address to the requested memory block and further allocates a physical cache location. If there is not a corresponding logical cache address available, the oldest logical cache allocation in the correct set is removed such that the new request may be processed. The allocation of the physical cache to the memory block is not changed. To accommodate this, the command processor 26 associates a physical cache location from the free pool 32 to the newly allocated logical cache address. To further illustrate the operation of memory controller 12, the example illustrated in FIGS. 2–9 is presented.

Figure 2:
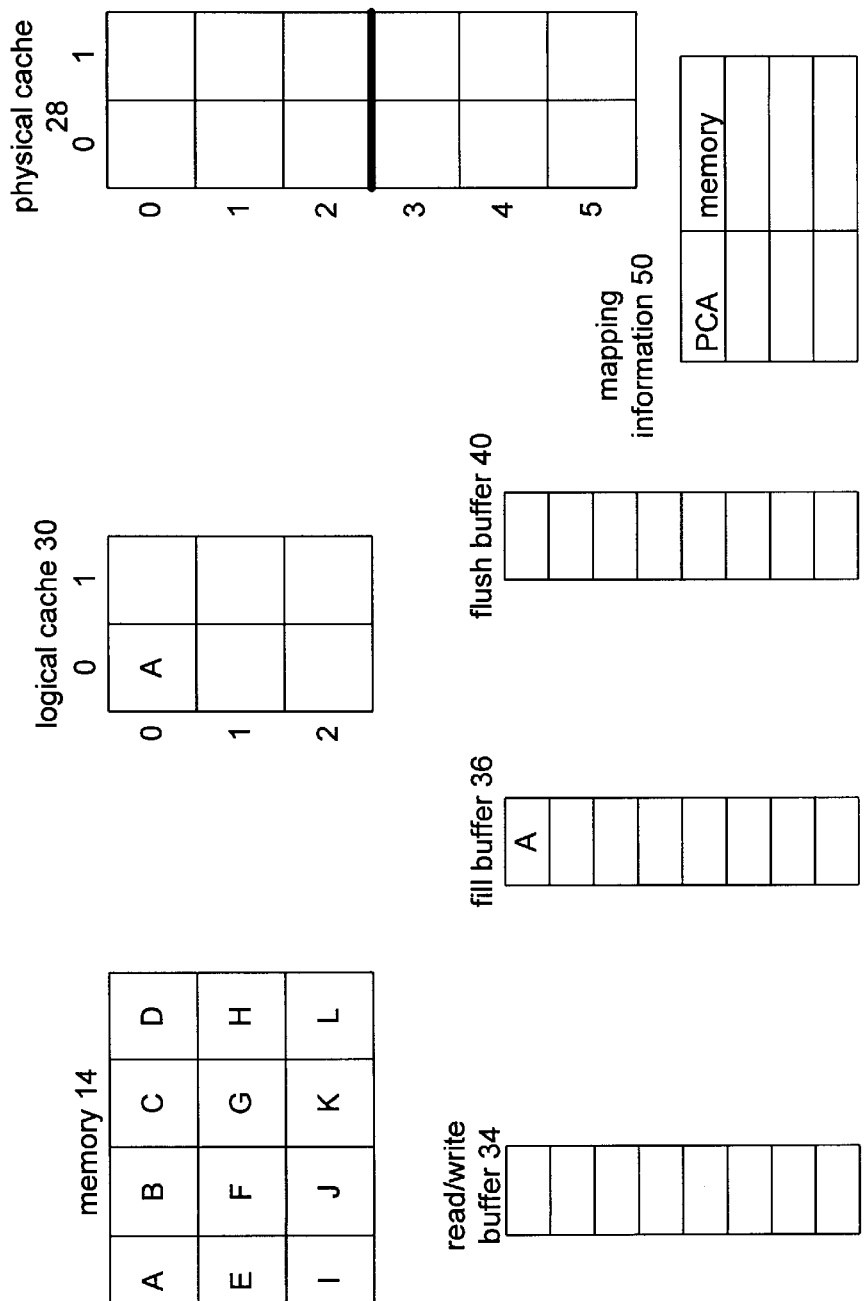

FIG. 2 illustrates the memories of the memory controller 12 and a corresponding table for commands received and commands performed during a corresponding operational interval, which may be a single clock cycle, multiple clock cycles, or a fraction of a clock cycle. FIG. 2 also illustrates operational interval 1. In this example, a single request to read/write of memory block A is received. Accordingly, the command processor 26 allocates a logical cache address of 00 to memory block A. Recall that memory blocks of a particular row correspond to a particular row of logic cache 30. In this example, the memory block row of A-D corresponds to the logic cache row of 00 and 01, memory block row E-H corresponds to logical cache locations 10 and 11, and memory block I-L corresponds to logical cache row 20 and 21. In addition to allocating a logical cache address to memory block A, the command processor places the request within the fill buffer 36. Note that the address stored for memory block A in fill buffer 36 may correspond to the logic cache address of 00, the starting physical address of memory block A, and/or mapping information of memory block A to logical cache address 00. For illustration purposes, the fill buffer 36 is shown to include the identity of memory block A and not an address. Note that the logical to physical mapping must occur before the request is enqueued in the fill FIFO since the physical cache address must be provided to know where to put the fill data.

Figure 3:
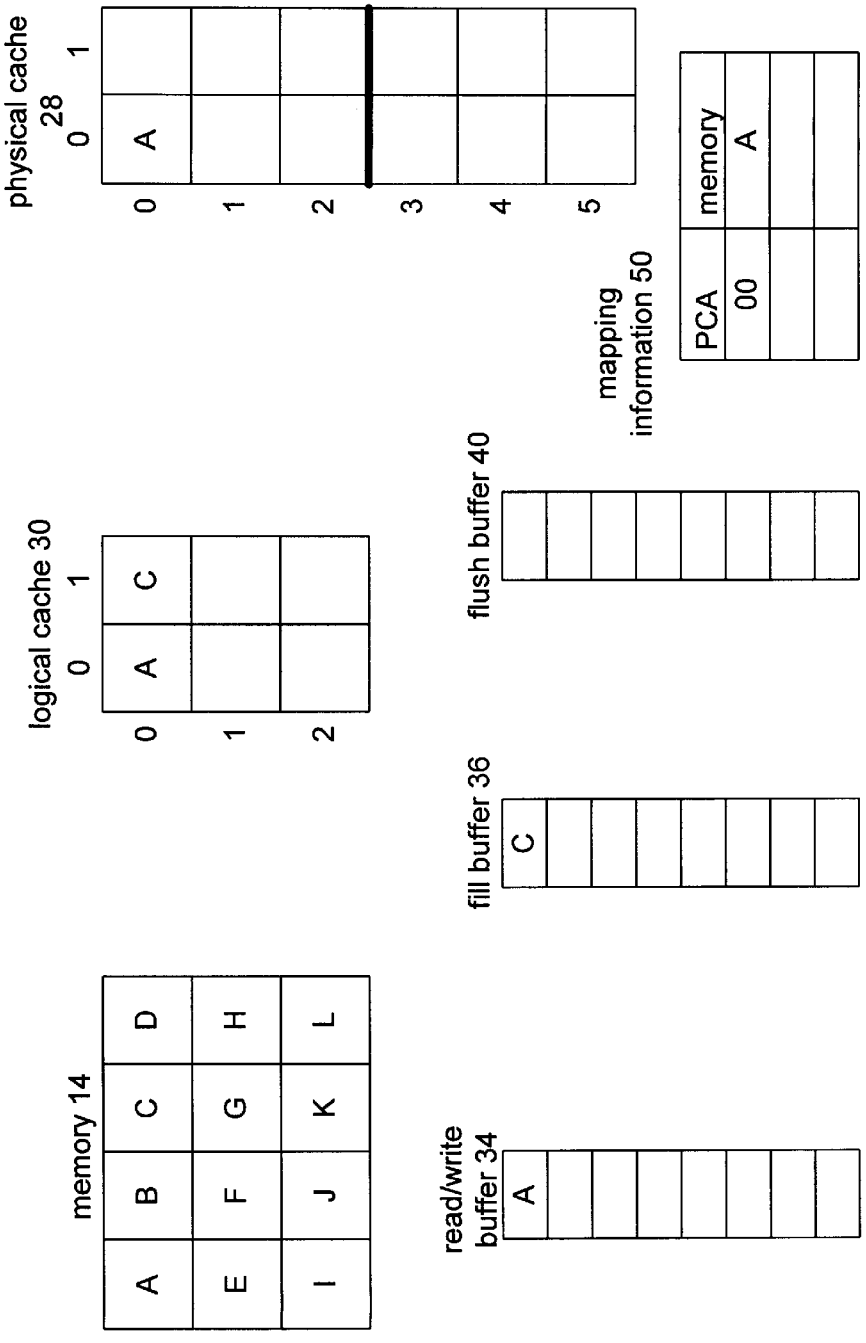

FIG. 3 illustrates the processing that occurs for this example during operational interval 2. During this interval, a read/write command for memory block C is received and a read memory block A is performed. Accordingly, for the read/write of memory block C, the command processor 26 allocates a logical cache address of 01 and places the identity of memory block C in the fill buffer 36. During this interval, the memory block A, which was identified during interval 1 within the fill buffer 36, is stored by the physical cache 28 at location 00. The command processor 26 updates mapping information 50 to indicate that memory block A has been stored in the physical cache location having a physical cache address of 00. In addition, the command processor 26 updates a read/write buffer 34 to indicate that memory block A is to have a read/write function performed thereon.

Figure 4:
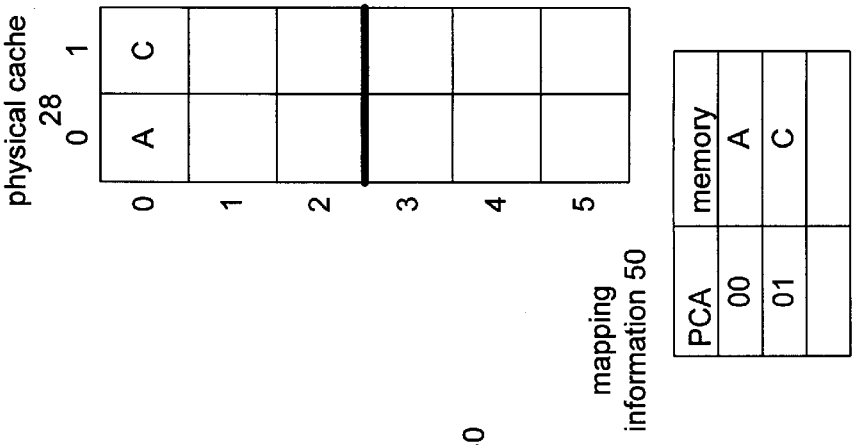
Figure 4:
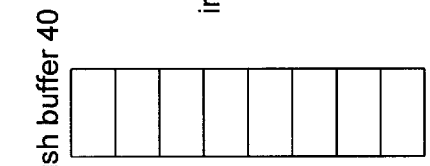
Figure 4:
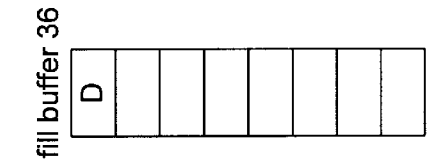
Figure 4:
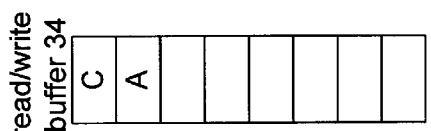

FIG. 4 illustrates the third operational interval of this example. During this interval, a read/write command for memory block D is received. In addition, commands of write to A and read C are performed. For the read/write memory block D command that is received, the command processor 28 attempts to allocate a logical cache address. Since, at interval 2, both logical cache addresses for memory block row A-D have been allocated, the command processor must overwrite a previous logical cache address allocation. Since the logical cache allocation to memory block A is the oldest, it is deleted. As one of average skill in the art will appreciate, other methods of determining which logical cache address to overwrite may be utilized. Accordingly, logical cache address 00 is now allocated to memory block D and memory D is identified within the fill buffer 36.

The write to memory block A is performed, thereby completing the requested read/write operation of memory block A. The processing of reading memory block C causes the data of memory block C to be written into physical cache location 01. In addition, mapping information 50 is updated to indicate that the data of memory block C is stored at the physical cache location having a physical cache address of 01.

Figure 5:
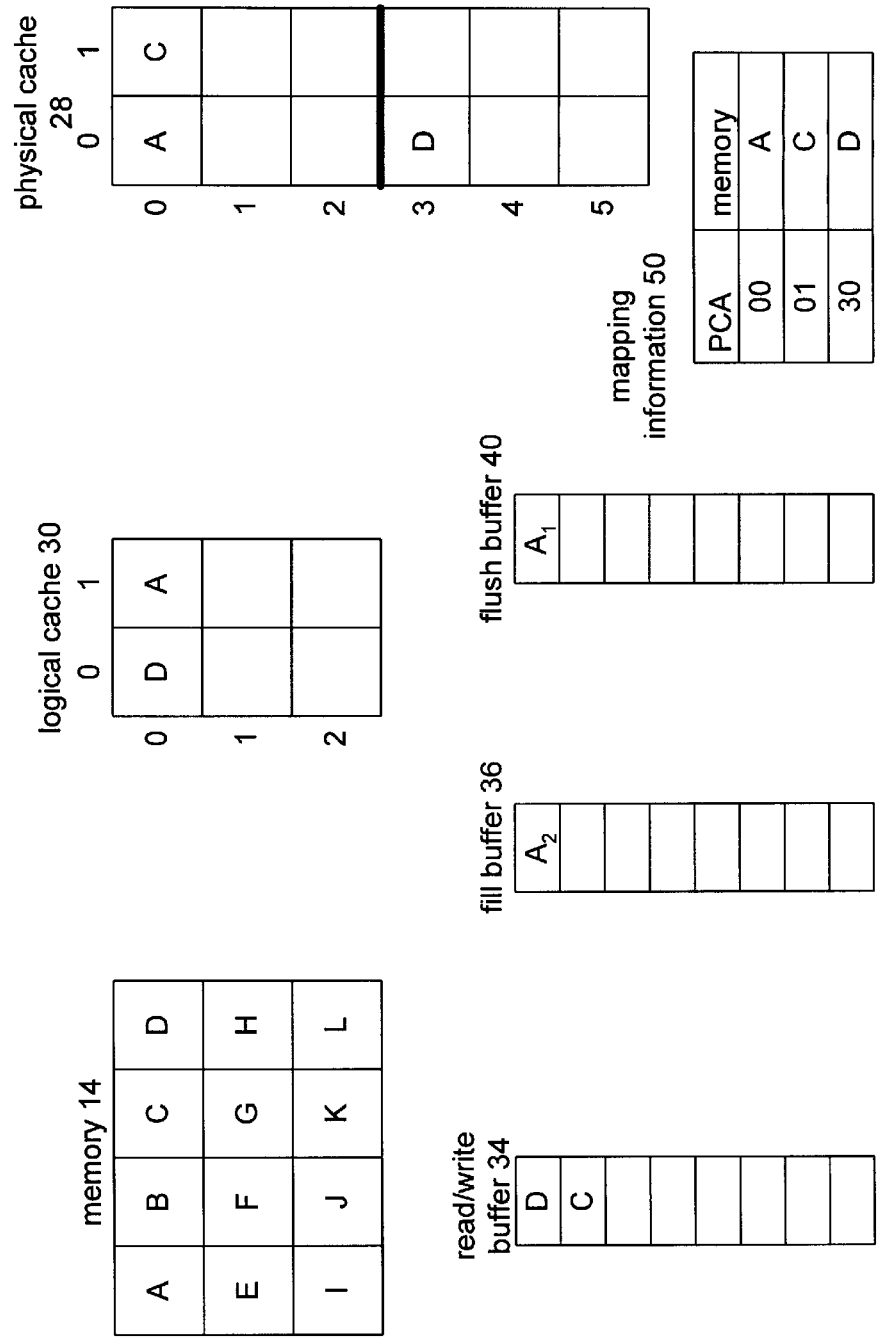

FIG. 5 illustrates the processing that occurs at interval 4 where a read/write of memory block A is received and the reading of memory block D is performed. The command processor 26, in response to the read/write memory block A command, attempts to allocate a logical cache address to memory block A. Since both of the logical cache addresses are currently utilized, one needs to be deleted. Since C is the older of the two, it is deleted. Having made this change, the logical cache address of 01 is allocated to memory block A.

To perform the reading of memory block D, the logical cache address of 00 is mapped to physical cache address 30, which was not currently being used and, as such, is in the free pool of physical cache locations. The mapping information 50 is updated to indicate that the date of memory block D is stored in physical cache location having a physical cache address of 30.

The read/write buffer 34 is updated to indicate that the read/write command for C and D are in the queue. The fill buffer 36 is updated with the request for filling the physical cache with data from memory block A. The flush buffer 40 is updated with the information regarding memory block A from the first read/write request from memory block A. The flush buffer 40 indicates that the first read/write of memory block A has been completed, thus it is ready for flushing back to memory 14. To accomplish the flush, when the host is done with the memory block A, a bit is cleared using known techniques. When the bit is cleared, the command processor 26 knows that this data can be flushed back to memory 14.

Figure 6:
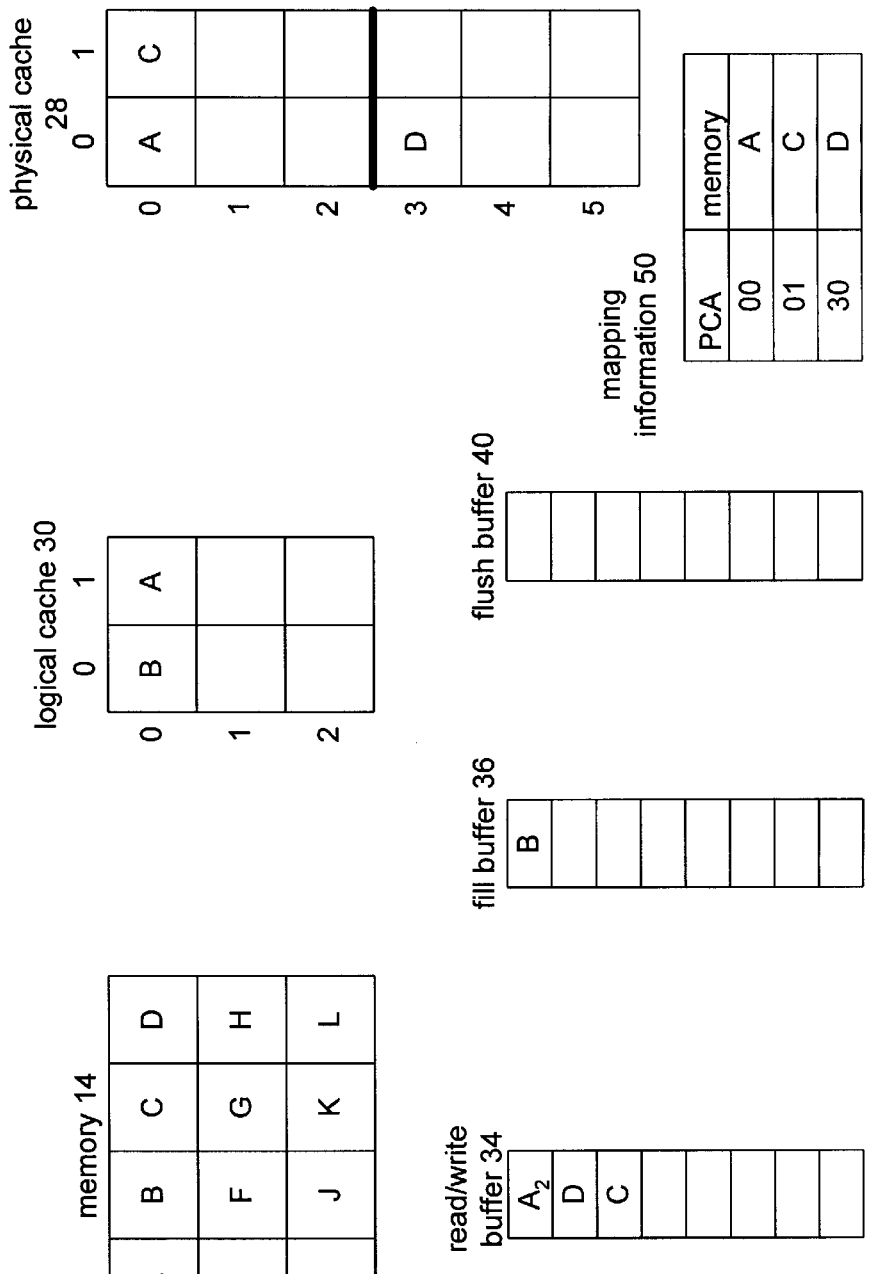

At this point, the newly received read/write request from memory block A has occurred prior to the flushing of memory block A from physical cache location having a physical cache address of 00. As such, at the next operational interval 5, which is illustrated in FIG. 6, the data of memory block A is flushed to memory 14 but is not flagged within the physical cache to indicate that physical cache location of 00 is available. Instead, the allocation of logical cache address 01 is provided to physical cache address 00. Accordingly, the mapping information 50 is updated to indicate that physical cache address 00 is mapped to memory block A. Note that the mapping information 50 is utilized to determine whether data for a corresponding memory block is already within the physical cache but is not allocated a logical cache address. Accordingly, when data of a memory block is in cache without a logical cache address, the operations upon the data are typically completed. Thus, the data is waiting to be flushed back to memory 14. Since the data has not yet been flushed, utilizing the mapping information 50, the command processor 26 can readily reallocate a logical cache address to the existing physical cache address. As such, the command processor 26 is utilizing the physical cache addresses, as opposed to the memory addresses as with victim caches, and, in addition, when a fill command is needed and the physical cache is full, the fill command can be readily accommodated by utilizing the free pool. This does not occur with victim caches where two flush operations need to occur before the fill operation can be processed.

In addition, at operational interval 5, a read/write command from memory block B is received. Accordingly, the command processor 26 allocates a logical cache address, in this instance location 00, and provides information regarding memory block B to fill buffer 36. Further, the read/write buffer 34 is updated to include the second read/write request for memory block A.

FIG. 7 illustrates the example at operational interval 6 where the write command for memory block C is performed and the read command for memory block B is performed. Since memory block C has not been flushed from physical cache 28, the command processor 26 must allocate another location within the free pool for storing the data of memory block B. In this example, physical cache location having a physical cache address of 31 is allocated from memory block B. Accordingly, the mapping information 50 is updated to include the mapping of the memory block B to the physical cache location 31. Having written the data from memory block B into physical cache 28, the read/write buffer 34 is also updated.

FIG. 8 illustrates the example at operational interval 7 where another read/write command from memory block B is received. Since memory block B already has a logical cache address of 00, the read/write request from memory block B is only indicated in fill buffer 36. Also during this interval, since the write command for memory block C was completed at interval 6, the memory block C is then added to flush buffer 40. Thus, during the subsequent interval, the memory block C will be flushed from the physical cache back to memory 14.

FIG. 9 illustrates operational interval 8 where the second read/write request for memory block B is queued in the read/write buffer 34. In addition, memory block C is flushed from physical cache location of 01 and removed from mapping information 50. As one of average skill in the art will appreciate, the number of memory blocks within memory may be significantly more than the 12 shown as well as the number of logical cache addresses and physical cache locations.

Figure 10:
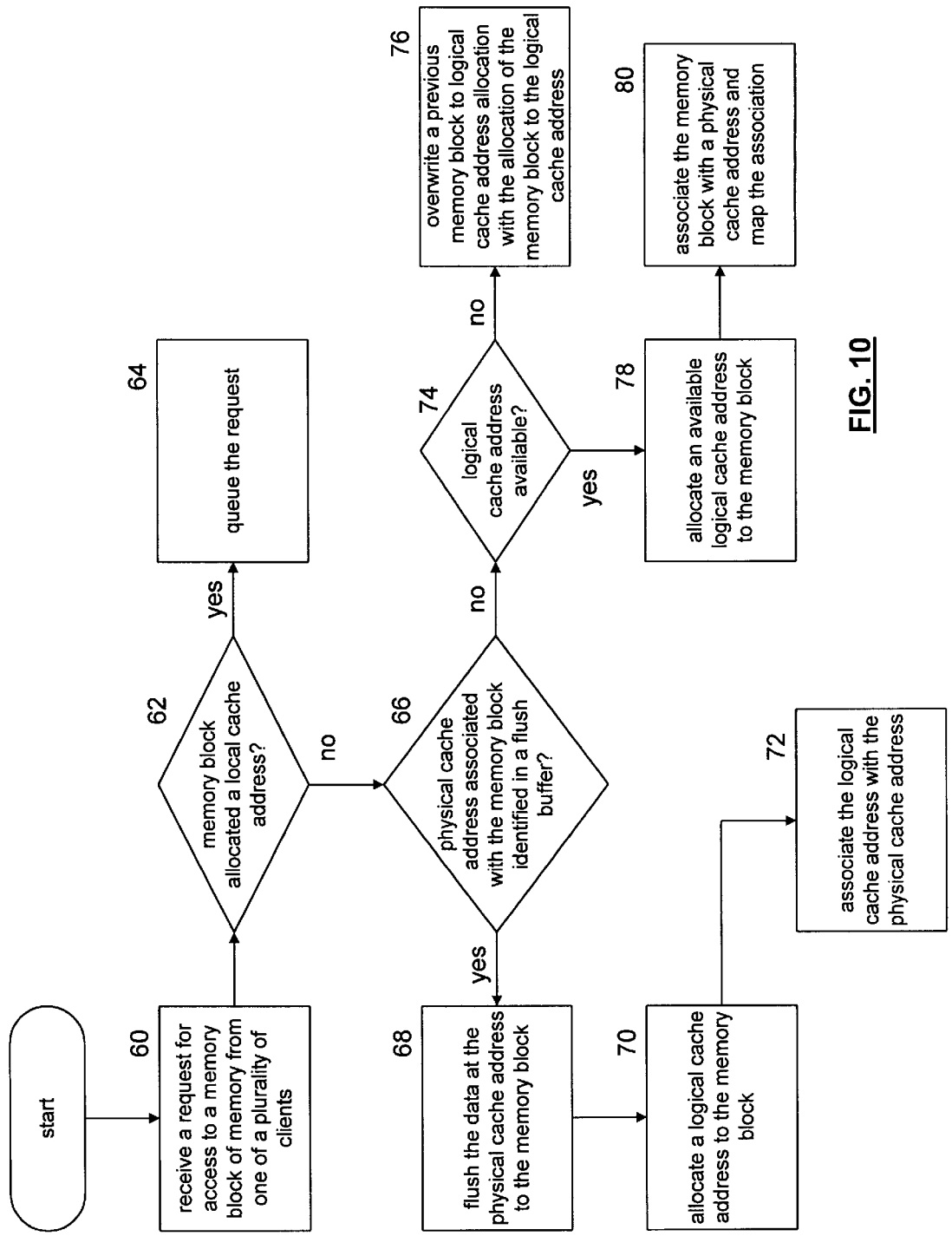
FIG. 10 illustrates a logic diagram of a method for associating cache locations with memory locations in accordance with the present invention.

FIG. 10 illustrates a logic diagram of a method for associating memory locations with a cache location. The processing steps of FIG. 10 may be implemented as operational instructions and stored in memory 44 and executed by processing module 42. The processing steps begin at step 60 where a request for access to a memory block of memory is received from one of a plurality of clients. Such clients were discussed with reference to FIG. 1. The process then proceeds to step 62 where a determination is made as to whether the memory block has been allocated a logical cache address. If "yes", the process proceeds to step 64 where the request is queued.

If, however, the memory block has not been allocated a logical cache address, the process proceeds to step 66. At step 66, a determination is made as to whether a physical cache address is associated with the memory block and is identified in a flush buffer. As such, a determination is being made as to whether the requested memory block is still within the physical cache but is not actively allocated a logical cache address. Thus, the memory block is awaiting a flush operation back to memory. If "yes", the process proceeds to step 68 where the data is flushed from the physical cache address to the memory block. The flushing, however, does not function as a normal flush operation where a normal flush operation then flags the physical cache location as being available. In this instance, the physical cache location is not flagged as available.

The process then proceeds to step 70 where a logical cache address is allocated to the memory block. The process then proceeds to step 72 where the logical cache address is associated with the physical cache address. Accordingly, mapping information is updated to indicate that the physical cache location is associated with a particular memory block.

If, at step 66, the physical cache address is not identified within a flush buffer, the process proceeds to step 74. At step 74 a determination is made as to whether a logical cache address is available. If so, the process proceeds to step 78 where an available logical cache address is allocated to the memory block. The process then proceeds to step 80 where the memory block is associated with a physical cache address and the information is updated within the mapping information. If, however, the logical cache address is not available, the process proceeds to step 76. At step 76, a previous memory block to logical cache allocation is overwritten with the new allocation of the memory block to logical cache address allocation.

Figure 11:
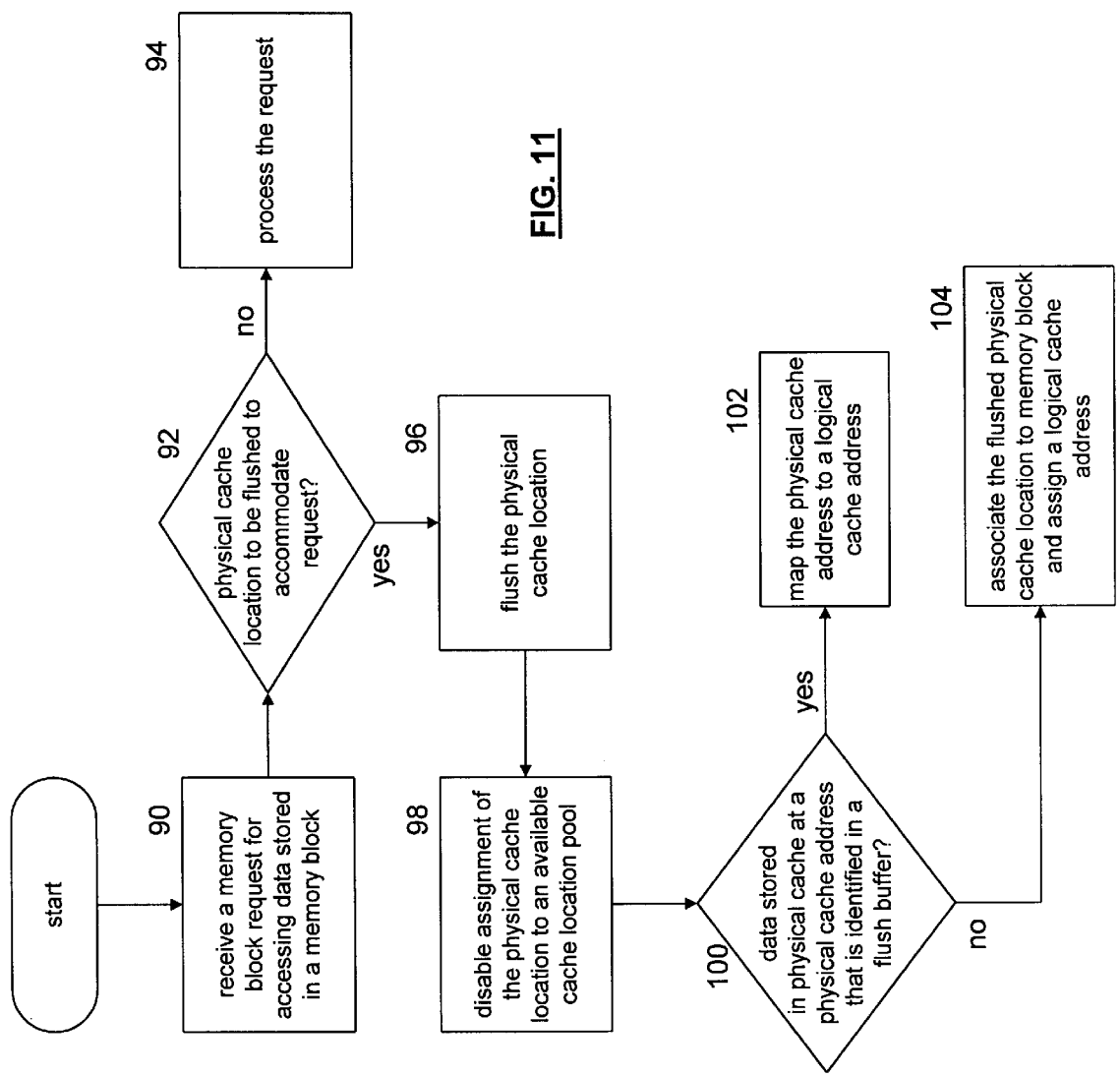
FIG. 11 illustrates a logic diagram of an alternate method for associating physical cache locations with memory locations.

FIG. 11 illustrates a logic diagram of an alternate method for associating a memory block with the cache location. The processing steps of FIG. 11 may be implemented as operational instructions and stored in memory 44 and subsequently executed by processing module 42. The process begins at step 90 where a memory block request for accessing data stored in a memory block is received. The process then proceeds to step 92 where a determination is made as to whether a physical cache location is to be flushed to accommodate the request. If not, the request is processed wherein the data of the memory block is filled into a physical cache location. This is done at step 94.

If, however, a physical cache location needs to be flushed to accommodate the request, the process proceeds to step 96. At step 96, the physical cache location is flushed. The process then proceeds to step 98 where assignment of the physical cache location to an available cache location pool is disabled. The process then proceeds to step 100 where a determination is made as to whether data stored in the physical cache location is the data identified in the flush buffer. In other words, a determination is made as to whether the incoming request is for the same memory block as the memory block assigned to the physical cache location that is to be flushed. If so, the process proceeds to step 102 where the physical cache address is mapped to a logical cache address. If, however, the inquiry at step 100 is "no", the process proceeds to step 104. At step 104, the flushed physical cache location will be overwritten with the data of the memory block corresponding to the newly received request. Accordingly, the physical cache location is associated to the incoming memory block of data and is assigned a logical cache address.

The preceding discussion has presented a method and apparatus for more efficient utilization of cache memory to reduce the effects of thrashing. In addition, the present invention provides a method and apparatus that overcomes the limitations of victim cache systems. In particular, the present invention allows for the command processor to utilize the physical cache addresses, as opposed to the memory addresses, when manipulating data within the memory system. In addition, the present invention does not require a double-flush operation before a fill operation can occur when the cache is full. As one of average skill in the art will appreciate, other embodiments may be derived from the teachings of the present invention without deviating from the scope of the claims or the spirit of the invention.

What is claimed is:

1. A method for association of a memory location with a cache location, the method comprises the steps of:
   a) receiving a request for access to a memory block of memory from one of plurality of clients;
   b) determining whether a physical cache address associated with the memory block is identified in a flush buffer when the memory block is not currently allocated a logical cache address of a plurality of logical cache addresses;
   c) when the physical cache address is identified in the flush buffer, allocating one of the plurality of logical cache addresses to the memory block; and
   d) associating the one of the plurality of logical cache addresses with the physical cache address.

2. The method of claim 1 further comprises flushing data contained at the physical cache address to the memory block when the physical cache address is identified in the flush buffer.

3. The method of claim 1, wherein step (b) further comprises determining that the physical cache address is associated with the memory block via cache mapping data.

4. The method of claim 1, wherein step (b) further comprises when the memory block is allocated to the logical cache address, queuing the request.

5. The method of claim 1, wherein step (b) further comprises, when the physical cache address is not associated with the memory block, determining whether another logical cache address of the plurality of logical cache addresses is available;
   when the another logical cache address is available, allocating the another logical cache address to the memory block;
   associating the memory block with one of a plurality of physical cache addresses; and
   mapping the association of the memory block with the one of the plurality of physical cache addresses.

6. The method of claim 5 further comprises, when none of the plurality of logical cache addresses is available,
   overwriting a previous memory block to logical cache address allocation with the allocation of the memory block to the logical cache address.

7. A method for association of memory locations, the method comprises the steps of:
   a) receiving a memory block request for accessing data stored in a memory block;
   b) determining whether a physical cache location is to be flushed to accommodate the memory block request;
   c) when the physical cache location is to be flushed, determining whether the data is stored in a physical cache at a physical cache address identified in a flush buffer; and
   d) when the data is stored in the physical cache at a physical cache address identified in a flush buffer, mapping the physical cache address to a logical cache location.

8. The method of claim 7, wherein step (c) further comprises:
performing the flush operation on the physical cache location, wherein the physical cache location is located at the physical cache address; and
disabling assignment of the physical cache location to an available cache location pool.

9. The method of claim 7, wherein step (c) further comprises accessing mapping information of the memory block to the physical cache.

10. The method of claim 7, wherein step (b) further comprises:
determining whether each of a set of logical cache locations are mapped to physical cache locations, wherein the set of logical cache locations is affiliated with a set of memory blocks; and
when the set of logical cache locations are mapped, indicating that the physical cache location is to be flushed.

11. A memory management system comprises:
a processing module; and
memory operably coupled to the processing module, wherein the memory stores operational instructions that cause the processing module to (a) receive a request for access to a memory block of memory from one of plurality of clients; (b) determine whether a physical cache address associated with the memory block is identified in a flush buffer when the memory block is not currently allocated a logical cache address of a plurality of logical cache addresses; (c) allocate one of the plurality of logical cache addresses to the memory block when the physical cache address is identified in the flush buffer; and (d) associate the one of the plurality of logical cache addresses with the physical cache address.

12. The memory management system of claim 11, wherein the memory further comprises operational instructions that cause the processing module to flush data contained at the physical cache address to the memory block when the physical cache address is identified in the flush buffer.

13. The memory management system of claim 11, wherein the memory further comprises operational instructions that cause the processing module to determine that the physical cache address is identified in the flush buffer by determining that the physical cache address is associated with the memory block via cache mapping data.

14. The memory management system of claim 11, wherein the memory further comprises operational instructions that cause the processing module to queue the request when the memory block is allocated to the logical cache address.

15. The memory management system of claim 11, wherein the memory further comprises operational instructions that cause the processing module to, when the physical cache address is not associated with the memory block, determine whether another logical cache address of the plurality of logical cache addresses is available;
allocate the another logical cache address to the memory block when the another logical cache address is available;
associate the memory block with one of a plurality of physical cache addresses; and
map the association of the memory block with the one of the plurality of physical cache addresses.

16. The memory management system of claim 15, wherein the memory further comprises operational instructions that cause the processing module to, when none of the plurality of logical cache addresses is available, overwrite a previous memory block to logical cache address allocation with the allocation of the memory block to the logical cache address.

17. A memory management system comprises:
a processing module; and
memory operably coupled to the processing module, wherein the memory stores operational instructions that cause the processing module to (a) receive a memory block request for accessing data stored in a memory block; (b) determine whether a physical cache location is to be flushed to accommodate the memory block request; (c) determine whether the data is stored in a physical cache at a physical cache address identified in a flush buffer when the physical cache location is to be flushed; and (d) map the physical cache address to a logical cache location when the data is stored in the physical cache at a physical cache address identified in a flush buffer.

18. The memory management system of claim 17, wherein the memory further comprises operational instructions that cause the processing module to:
perform the flush operation on the physical cache location, wherein the physical cache location is located at the physical cache address; and
disable assignment of the physical cache location to an available cache location pool.

19. The memory management system of claim 17, wherein the memory further comprises operational instructions that cause the processing module to access mapping information of the memory block to the physical cache.

20. The memory management system of claim 17, wherein the memory further comprises operational instructions that cause the processing module to:
determine whether each of a set of logical cache locations are mapped to physical cache locations, wherein the set of logical cache locations is affiliated with a set of memory blocks; and
when the set of logical cache locations are mapped, indicate that the physical cache location is to be flushed.

* * * * *